United States Patent [19]
Panwar

[11] Patent Number: 6,075,931
[45] Date of Patent: *Jun. 13, 2000

[54] METHOD FOR EFFICIENT IMPLEMENTATION OF MULTI-PORTED LOGIC FIFO STRUCTURES IN A PROCESSOR

[75] Inventor: Ramesh Panwar, Santa Clara, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/882,529

[22] Filed: Jun. 25, 1997

[51] Int. Cl.[7] .................................................. G06F 13/10
[52] U.S. Cl. ........................................................ 395/500.02
[58] Field of Search ....................... 395/500.02; 365/221

[56] References Cited

U.S. PATENT DOCUMENTS

| | | | |
|---|---|---|---|
| 5,027,326 | 6/1991 | Jones | 365/221 |
| 5,134,561 | 7/1992 | Liptay | 395/425 |
| 5,487,156 | 1/1996 | Popescu et al. | 395/375 |
| 5,546,597 | 8/1996 | Martell et al. | 395/800 |
| 5,560,032 | 9/1996 | Nguyen et al. | 395/800 |
| 5,561,776 | 10/1996 | Popescu et al. | 395/375 |
| 5,625,800 | 4/1997 | Brayton et al. | 395/500 |
| 5,625,837 | 4/1997 | Popescu et al. | 395/800 |
| 5,740,406 | 4/1998 | Rosenthal et al. | 395/500 |
| 5,761,706 | 6/1998 | Kessler | 711/118 |

*Primary Examiner*—Paul R. Lintz
*Assistant Examiner*—Thuan Do
*Attorney, Agent, or Firm*—William J. Kubida; Stuart T. Langley; Hogan & Hartson LLP

[57] ABSTRACT

A system and method for efficient implementation of a multi-port logic first-in, first-out ("FIFO") structure or particular utility in high clock speed integrated circuit ("IC") processor design which provides for reduced on-chip area requirements and fewer and less timing critical electrical interconnect paths. The advantageous reduction in IC area and enhanced performance disclosed herein is enabled through the rotation of the inputs and outputs of the FIFO; maintenance of decoded head and tail pointers, and folding the FIFO entry locations such that the entries are arranged in an interleaved fashion.

7 Claims, 8 Drawing Sheets

METHOD FOR EFFICIENT IMPLEMENTATION OF MULTI-PORTED LOGIC FIFO STRUCTURES IN A PROCESSOR

CROSS-REFERENCE TO RELATED APPLICATIONS

The subject matter of the present application is related to that of co-pending U.S. patent application Ser. No. 08/881,958 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 for AN APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/882,145 for APPARATUS FOR DYNAMICALLY RECONFIGURING A PROCESSOR filed concurrently herewith by Ramesh Panwar and Ricky C. Hetherington; Ser. No. 08/881,732 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P.K. Chidambaran and Ricky C. Hetherington; Ser. No. 08/882,731 for APPARATUS FOR TRACKING PIPELINE RESOURCES IN A SUPERSCALAR PROCESSOR filed concurrently herewith by Ramesh Panwar; Ser. No. 08/882,525 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 for AN APPARATUS FOR DELIVERING PRECISE TRAPS AND INTERRUPTS IN AN OUT-OF ORDER PROCESSOR filed concurrently herewith by Ramesh Panwar; Ser. No. 08/881,728 for NON-BLOCKING HIERARCHICAL CACHE THROTTLE filed concurrently herewith by Ricky C. Hetherington and Thomas M. Wicki; Ser. No. 08/881,727 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

SUMMARY OF THE INVENTION

The system and method of the present invention advantageously eliminates the die area consuming row decoders for the head and tail pointers in an integrated circuit implementation of a multi-ported logic FIFO structure and requires only one word line per entry in the register file. This results in a considerable saving in the amount of on-chip area required in the design and layout of the FIFO structure since the area needed is directly proportional to the total number of word lines in the FIFO.

The system and method of the present invention allows for an efficient implementation of multi-ported logic FIFO structures of particular utility in conjunction with processor, network chips and other high speed IC design. It provides an improved implementation that is less consuming of expensive IC die area, provides a reduced power consumption of especial importance in high speed, high density IC design and requires fewer and shorter on-chip interconnect resources to implement, thereby enabling even higher clock speed operation.

The advantageous reduction in IC area and enhanced performance disclosed herein is enabled through the provision of three fundamental techniques: a) rotating the inputs and outputs of the FIFO; b) maintaining decoded head and tail pointers, and c) folding the FIFO such that the entries are arranged in an interleaved fashion (i.e. 0, 7, 1, 6, 2, 5, 3, 4 in an exemplary 8 entry FIFO). The rotators at the inputs and outputs of the FIFO are relatively inexpensive to implement in terms of on-chip area.

In an exemplary implementation of a microprocessor architecture as disclosed herein, multi-ported logic FIFOs in accordance with the present invention may be utilized in an integrated circuit processor design. With ever higher clock speeds, increased integration density and on-chip power consumption constraints, the efficient implementation of multi-ported logic FIFO structures has become increasingly important inasmuch as these structures are utilized throughout various aspects of the design.

Broadly, what is disclosed herein is a FIFO which comprises a memory array having n entry access lines and a plurality of data output lines. An n-bit head pointer indicates an entry position in the memory array available for accessing data therein. Entry generation logic (for example, word line generation logic) is coupled to the n entry access lines and responsive to the n-bit head pointer for generating a number of additional entry positions in the memory array based upon the entry position indicated by n-bit head pointer. The entry generation logic asserts the entry access lines corresponding to the entry position and the additional entry positions to enable access to the memory array. In a particular embodiment, the FIFO may further comprise pointer update logic responsive to the n-bit head pointer and an external control signal for updating the n-bit head pointer indication.

Further disclosed herein is a method for accessing data entries in a memory array having n entry access lines and a plurality of data output lines. The method comprises the steps of pointing to an entry position in the memory array and generating a number of additional entry positions in the memory array based upon the entry position. Selected ones of the n entry access lines are asserted corresponding to the entry position and the additional entry positions and the data entries corresponding to the entry position and the additional entry positions are place on the plurality of data output lines.

Further disclosed herein is a memory array having n entry access lines for accessing selected ones of a number of memory entry locations in the memory array and a plurality of data output lines for presenting data read out from the selected memory entry locations. The memory array comprises n memory entry locations extending substantially linearly between first and second ends thereof, with the memory entry locations being substantially interleaved such that a first of the memory entry locations is proximate to the first end thereof and an (n/2)–1 location of the memory entry locations is proximate to the second end thereof.

BRIEF DESCRIPTION OF THE DRAWINGS

The aforementioned and other features and objects of the present invention and the manner of attaining them will become more apparent and the invention itself will be best understood by reference to the following description of an exemplary embodiment taken in conjunction with the accompanying drawings, wherein.

DESCRIPTION OF AN EXEMPLARY EMBODIMENT

Figure 1:
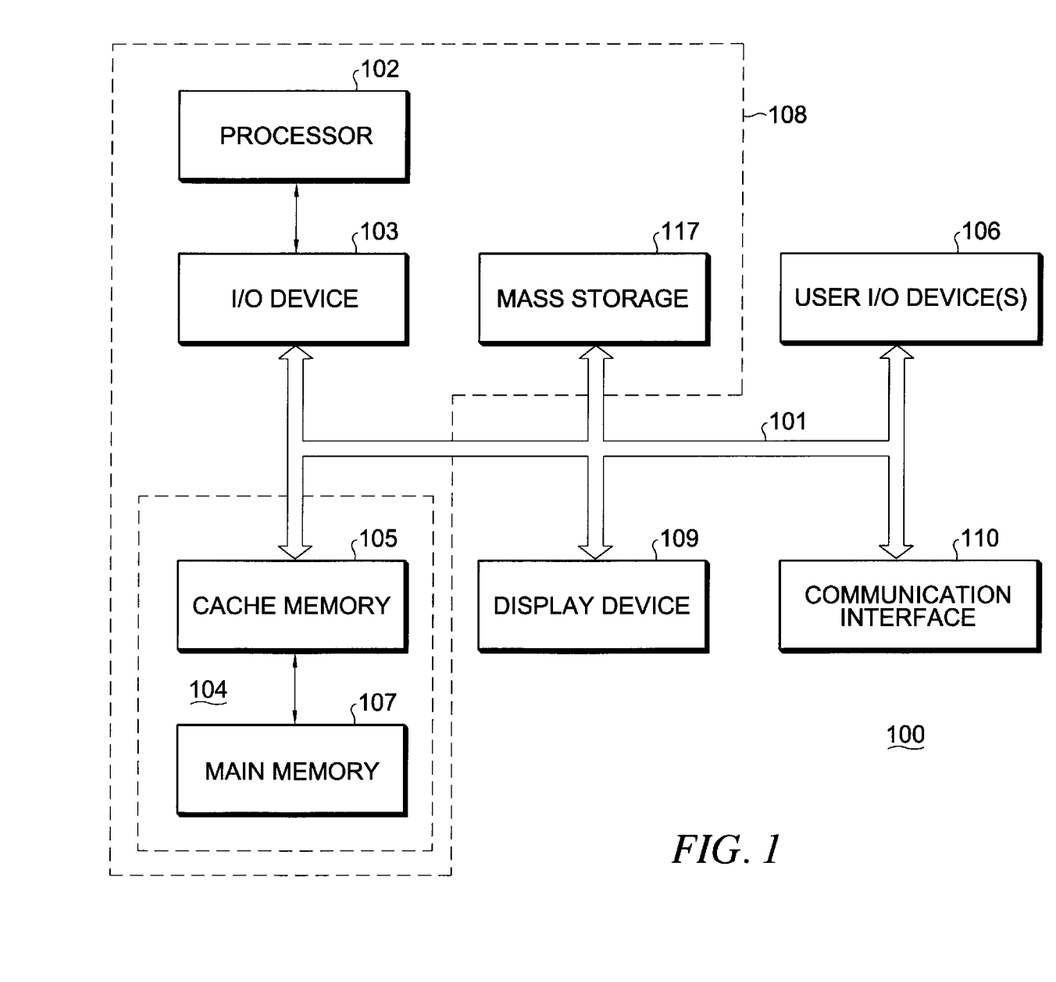
FIG. 1 illustrates a functional block diagram of an exemplary computer system incorporating the system and method for efficient implementation of multi-ported logic FIFO structures in accordance with the present invention as disclosed herein.

With reference now to FIG. 1, processor architectures can be represented as a collection of interacting functional units as shown. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
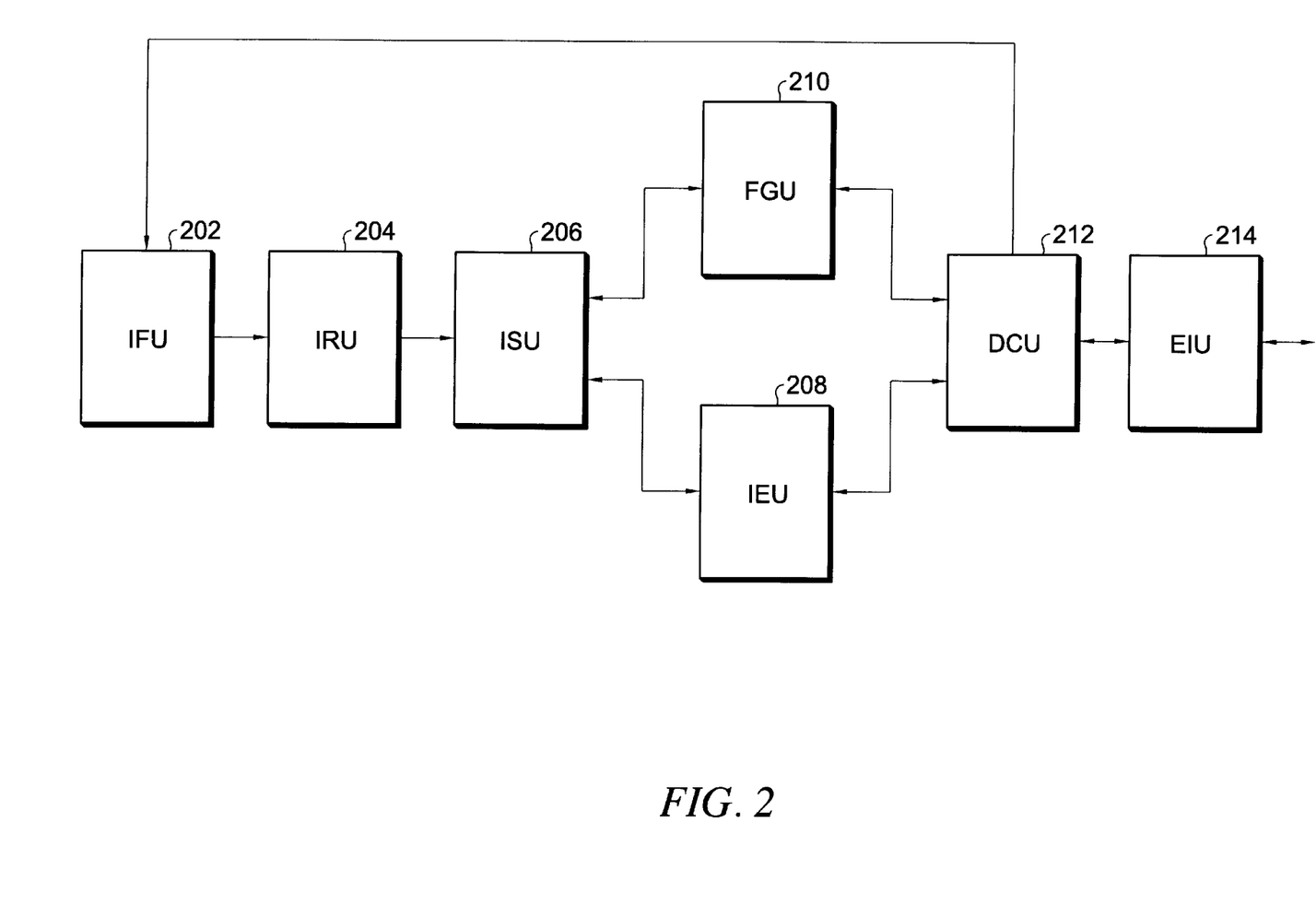
FIG. 2 illustrates an exemplary embodiment of an integrated circuit processor in functional block diagram form incorporating the system and method in accordance with the present invention.

The present invention is described in terms of systems and methods particularly useful in a superpipelined and superscalar processor 102 shown in block diagram form in FIG. 1 and the succeeding FIG. 2. The particular examples represent implementations useful in high clock frequency operation and processors that issue and executing multiple instructions per cycle ("IPC"). However, it is expressly understood that the inventive features of the present invention may be usefully embodied in a number of alternative processor architectures and other integrated circuit designs that will benefit from the features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube ("CRT") monitor, liquid crystal display ("LCD") or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units. Instruction fetch unit ("IFU") 202 comprises instruction fetch mechanisms and includes, among other things, an instruction cache for storing instructions, branch prediction logic, and address logic for addressing selected instructions in the instruction cache. The instruction cache is commonly referred to as a portion ("I$") of the level one ("L1") cache with another portion ("D$") of the L1 cache dedicated to data storage. IFU 202 fetches one or more instructions at a time by appropriately addressing the instruction cache. The instruction cache feeds addressed instructions to instruction rename unit ("IRU") 204. Preferably, IFU 202 fetches multiple instructions each cycle and in a specific example fetches eight instructions each cycle.

In the absence of conditional branch instruction, IFU 202 addresses the instruction cache sequentially. The branch prediction logic in IFU 202 handles branch instructions, including unconditional branches. An outcome tree of each branch instruction is predicted using any of a variety of available branch prediction algorithms and mechanisms. More than one branch can be predicted simultaneously by supplying sufficient branch prediction resources. After the branches are predicted, the predicted address is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent false dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched from the instruction cache but has not yet completed or been retired. IRU 204 is described in greater detail with reference to FIG. 3. IRU 204 outputs renamed instructions to instruction scheduling unit ("ISU") 206

Program code may contain complex instructions, also called "macroinstructions", from the running object code. It is desirable in many applications to break these complex instructions into a plurality of simple instructions or "microinstructions" to simplify and expedite execution. In a specific implementation, the execution units are optimized to precisely handle instructions with a limited number of dependencies using a limited number of resources (i.e., registers). complex instructions include any instructions that require more than the limited number of resources or involve more than the limited number of dependencies. IRU 204 includes mechanisms to translate or explode complex instructions into a plurality of microinstructions. These microinstructions are executed more efficiently in the execution units (e.g., floating point and graphics execution unit ("FGU") 208 and integer execution unit ("IEU") 214) than could the macroinstructions.

ISU 206 receives renamed instructions from IRU 204 and registers them for execution. Upon registration, instructions are deemed "live instructions" in the specific example. ISU 206 is operative to schedule and dispatch instructions as soon as their dependencies have been satisfied into an appropriate execution unit (e.g., integer execution unit ("IEU") 208 or floating point and graphics unit ("FGU") 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to register files and control registers upon complete execution of an instruction. ISU 206 is responsive to exception conditions and discards operations being performed on instructions subsequent to an instruction generating an exception in the program order. ISU 206 quickly remove instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating point unit ("FPU") in designs in which special purpose graphic and multimedia instructions are not used. FGU 210 preferably includes mechanisms to access single and/or double precision architectural registers as well as single and/or double precision rename registers.

A data cache memory unit ("DCU") 212 including cache memory 105 shown in FIG. 1 functions to cache memory reads from off-chip memory through external interface unit ("EIU") 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

Figure 3:
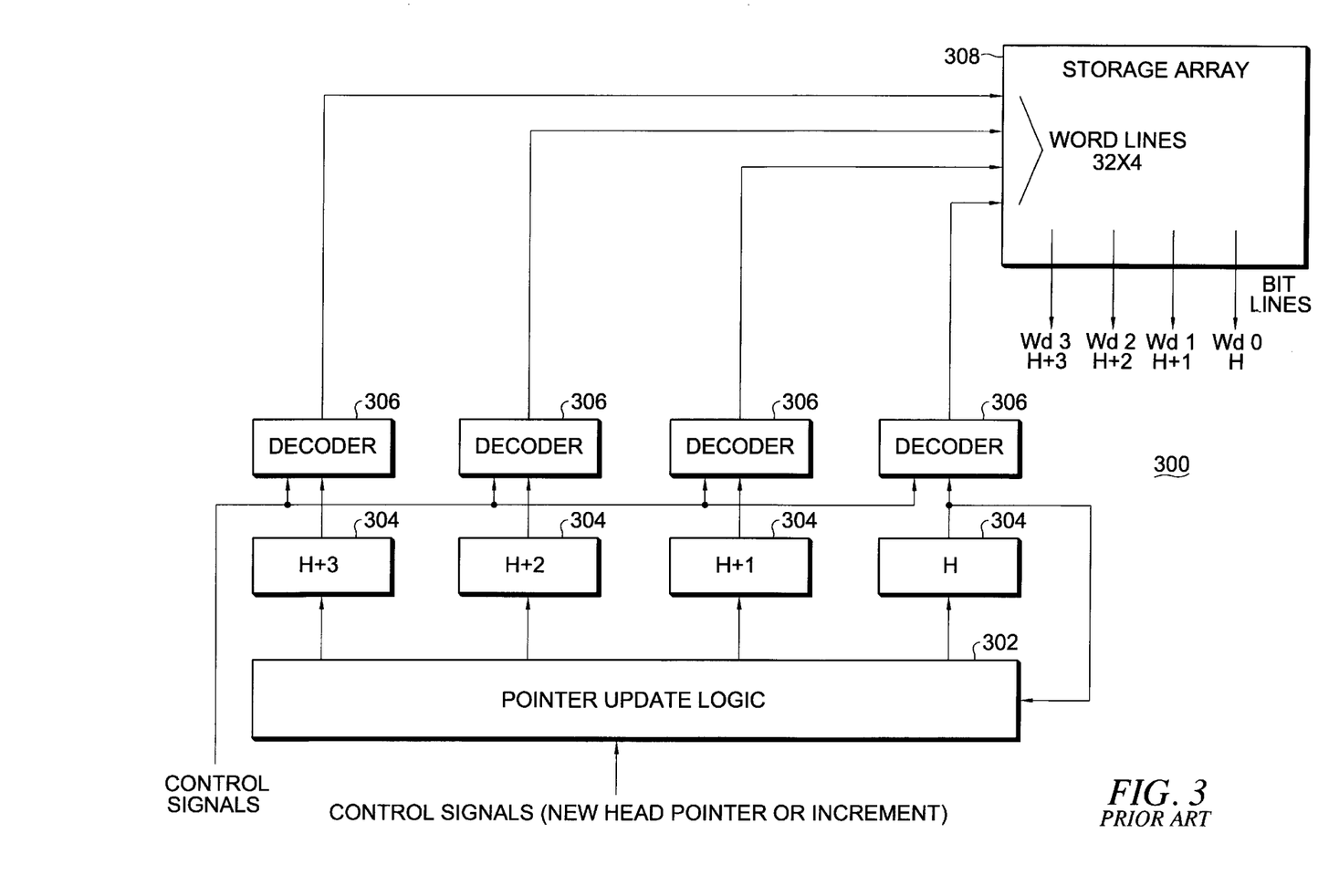
FIG. 3 is a functional block diagram of a prior art implementation of a multi-ported logic FIFO utilized in microprocessor design illustrating the utilization of multiple head pointer blocks and associated decoders and requiring the use of 32×4 word line inputs to the storage array.

With reference additionally now to FIG. 3, a prior art implementation of a multi-ported logic FIFO structure 300 is shown. The FIFO 300 includes pointer update logic 302 which is responsive to external control signals which specify either a new head pointer ("H") or an increment to the existing head pointer. The pointer update logic 302 provides inputs to four, 5-bit pointer registers 304 that hold slots that are available for writing. The first of the pointer registers 304 holds the head pointer and, since the available slots are in sequential order, the remaining pointer registers 304 hold H+1, H+2 and H+3 respectively.

Each of the pointer registers 304 are decoded by an associated 5-to-32 decoder 306 to produce the activation signals on the 32×4 word lines to a storage array 308. Logic may also provided for updating the pointers based on external control signals to the decoders 306 from incrementers or multiplexers as required.

The storage array 308 comprises a number of memory entry locations (not shown) which may be accessed, for example, to read out the contents of the entry locations onto a number of bit lines, with the data on the bit lines corresponding to the entry accessed by word lines Wd0 through Wd3, with each of these corresponding to the head pointer (H) and H+1, H+2 and H+3 respectively.

The FIFO 300 implementation illustrated has inherent inefficiencies due to the relatively large number of word lines (32×4) which are required to access the storage array 308. Since many integrated circuit designs, particularly processors, are constrained by the number and length of conductors which may be utilized on-chip to interconnect components, the necessity of having 4 lines per each of the 32 words is undesirable. Moreover, the row decoders 306 and pointer update logic 302 consume an additionally large amount of on-chip area.

Figure 4:
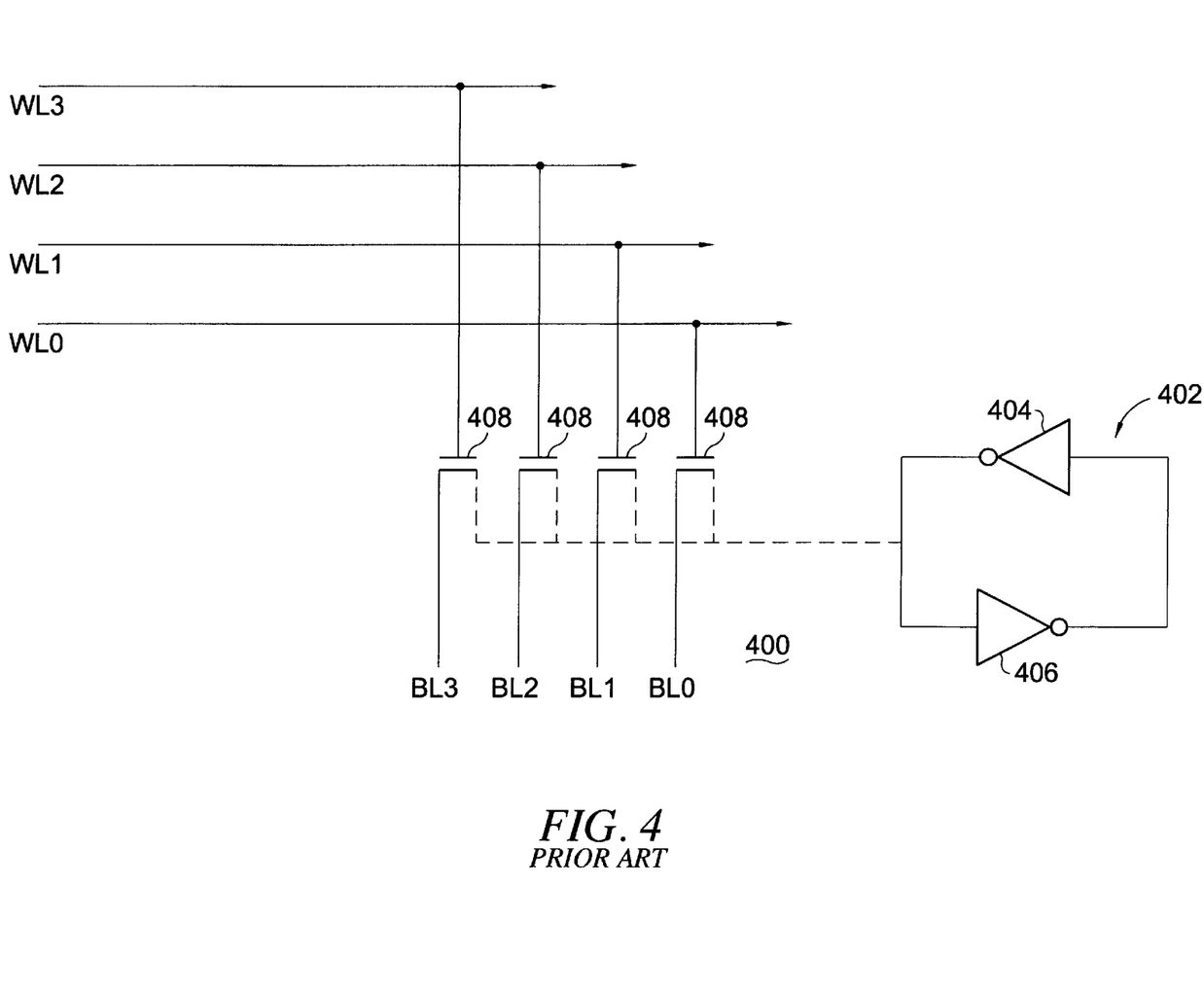
FIG. 4 is a simplified schematic level representation of a portion of the storage array of FIG. 3 illustrating a typical memory cell comprising a pair of cross-coupled inverters and the coupling of the word line inputs to respective pass transistors in order to place the contents of a given memory cell on an associated bit line.

With reference additionally now to FIG. 4, a portion of a storage array 400 which may form a part of the storage array 308 of FIG. 3 is shown. The storage array 400 may comprise a plurality of entry storage locations which are made up of, for example, a number of latches 402 comprising a pair of cross-coupled inverters 404 as shown. By activating selected word lines to the storage array 400 (for example, word lines WL0 through WL3), the contents of a given latch 402 is place on the corresponding bit line (BL0 through BL3 respectively) by activation of a corresponding pass transistor 408

Figure 5:
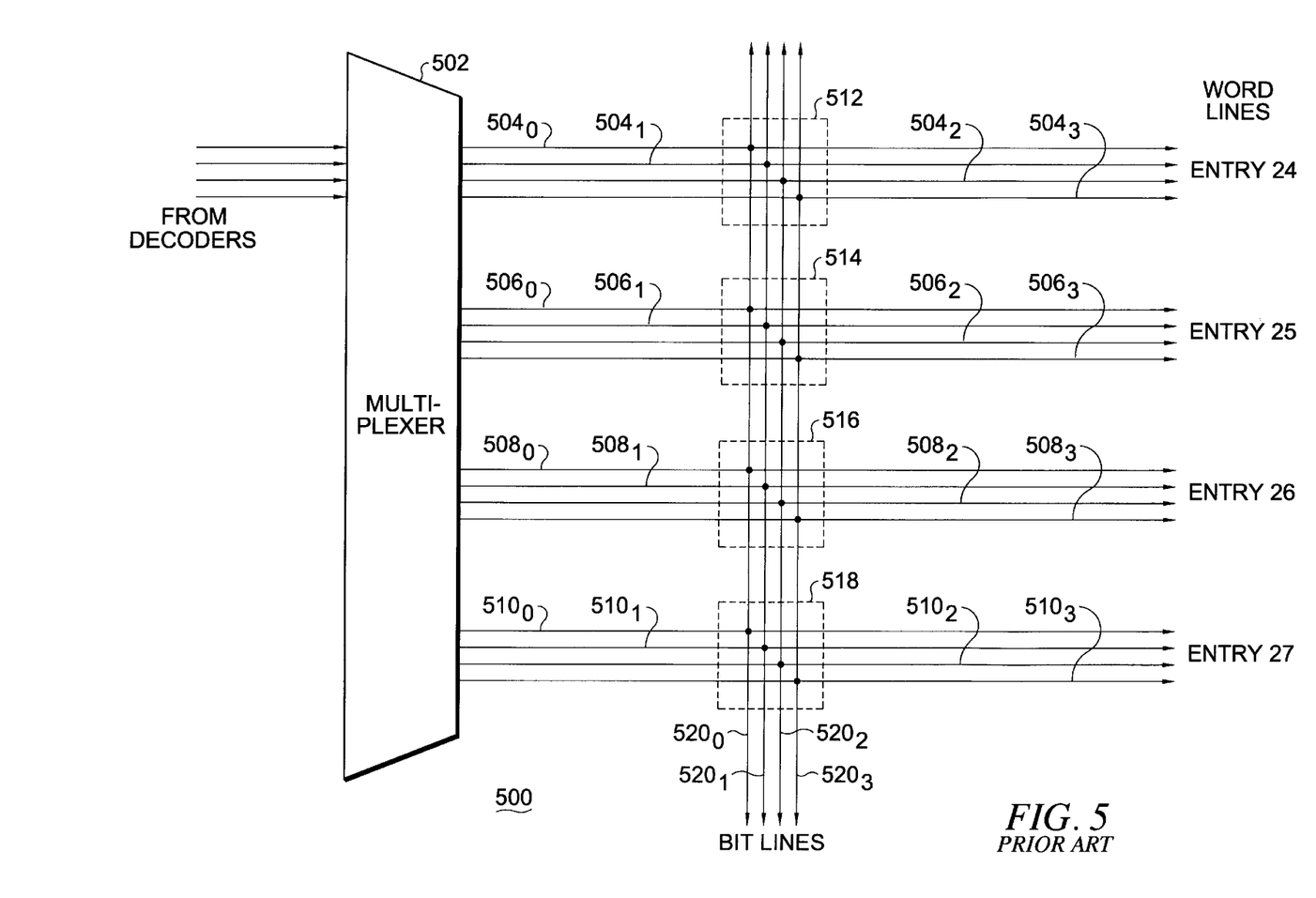
FIG. 5 is higher level illustration of a prior art implementation of a portion of a multi-ported logic FIFO structure illustrating in greater detail the necessity of providing four word lines per entry in the register file.

With reference additionally now to FIG. 5, a portion of a prior art storage array 500 is illustrated with inputs to a multiplexer 502 being supplied, for example, by the decoders 306 of FIG. 3. The multiplexer serves to selectively activate four word lines per entry in the storage array. In this regard, the multiplexer 502 would be required to activate a selected one of the word lines $504_0$ through $504_3$ to access entry location 512 (e.g. entry 24), a selected one of the word lines $506_0$ through $506_3$ to access entry location 514 (e.g. entry 25), a selected one of the word lines $508_0$ through $508_3$ to access entry location 516 (e.g. entry 26) and a selected one of the word lines $510_0$ through $510_3$ to access entry location 518 (e.g. entry 27). As an example, logic levels of "1,0,0,0" on word lines $504_0$ through $504_3$ would be required to place entry 24 on bit line $520_0$; logic levels of "0,1,0,0" on word lines $506_0$ through $506_3$ would place entry 25 on bit line $520_1$; logic levels of "0,0,1,0" on word lines $508_0$ through $508_3$ would place entry 26 on bit line $520_2$ and logic levels of "0,0,0,1" on word lines $510_0$ through $510_3$ would place entry 27 on bit line $520_3$. As can be seen the requirement that four bit lines be activated per entry is exceedingly inefficient.

Figure 6:
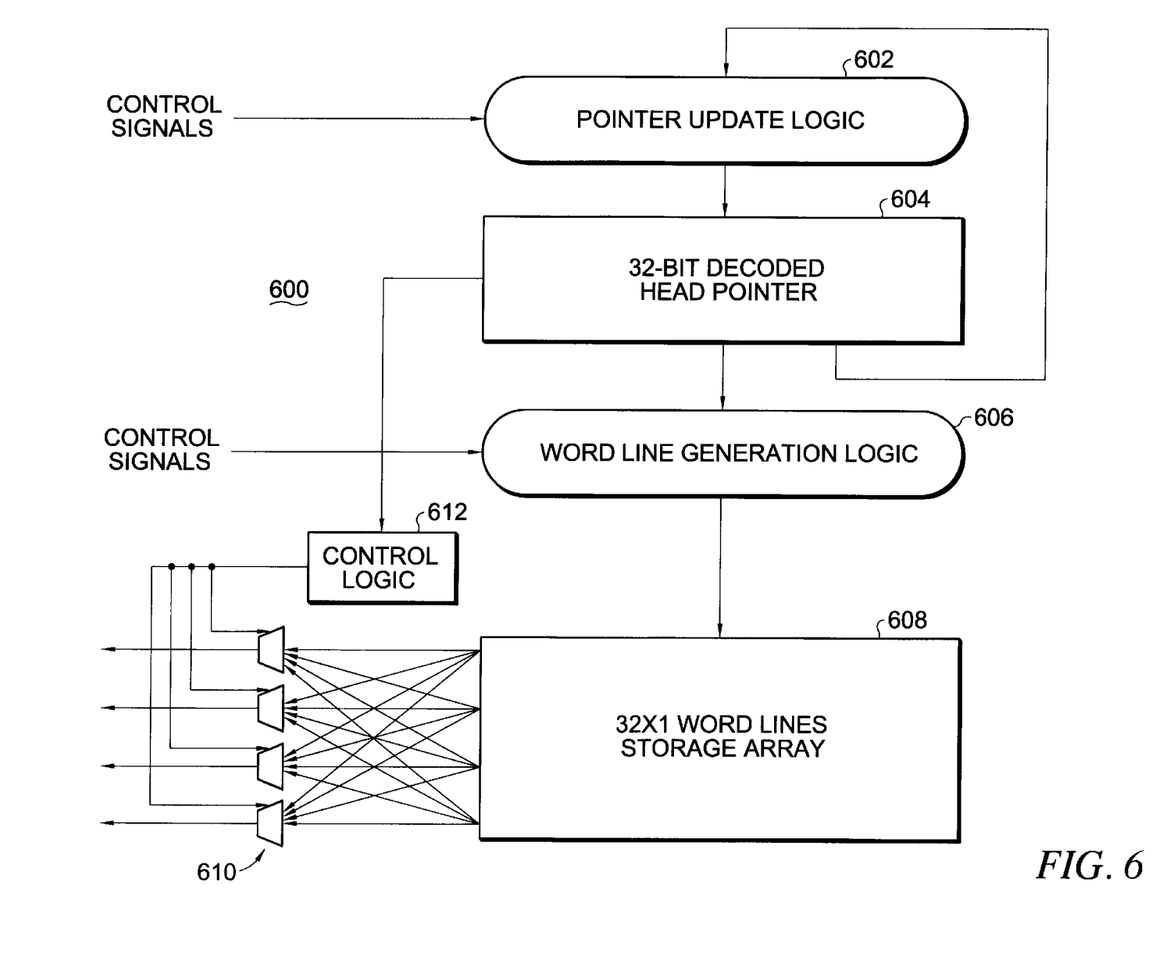
FIG. 6 is a functional block diagram of a multi-ported logic FIFO structure in accordance with the present invention which eliminates the row decoders for the head and tail pointers of prior art designs and requires only one word line per entry in the register file.

With reference not to FIG. 6 multi-port logic FIFO structure 600 in accordance with the present invention is shown. The FIFO 600 comprises, in pertinent part, pointer update logic 602 which is coupled to receive external control signals to direct its function in conjunction with an n-bit (e.g. 32-bit) decoded head pointer 604. The n-bit decoded head pointer 604 is coupled back to the pointer update logic 602 as well as to an entry (or word line) generation logic 606 which may also receive appropriate external control signals. The entry generation logic 606 supplies appropriate enabling inputs to the n (e.g. 32) word lines of a storage array 608 as will be more fully described hereinafter.

The storage array 608 provides bit line data outputs for data read out from the storage array 608 which may be provided to a number of multiplexers 610 which select an appropriate one of the bit lines in accordance with a control logic block 612 as defined by the n-bit decoded head pointer 604. This may be done so as to order the bit line data as will be more fully described hereinafter with respect to the succeeding figure.

The FIFO 600 of the present invention comprises an efficient implementation of a multi-ported logic FIFO that utilizes only a single set of 32-bit word lines in the exemplary embodiment illustrated. It relies on maintaining a 32-bit head pointer 604. The head pointer 604 is "one-hot", which means that only one bit is set to "1" in the head pointer 604 and all of the other bits are "0". Utilizing this technique, the manipulation of the head pointer 604 becomes a single shift operation as opposed to requiring an increment or add operation in conventional implementations as previously described. For example, to read out two words in the prior art FIFO 300 of FIG. 3, the head pointer would have to be incremented by two requiring an add operation. With the FIFO 600 of the present invention, only a shift operation is required.

Figure 7:
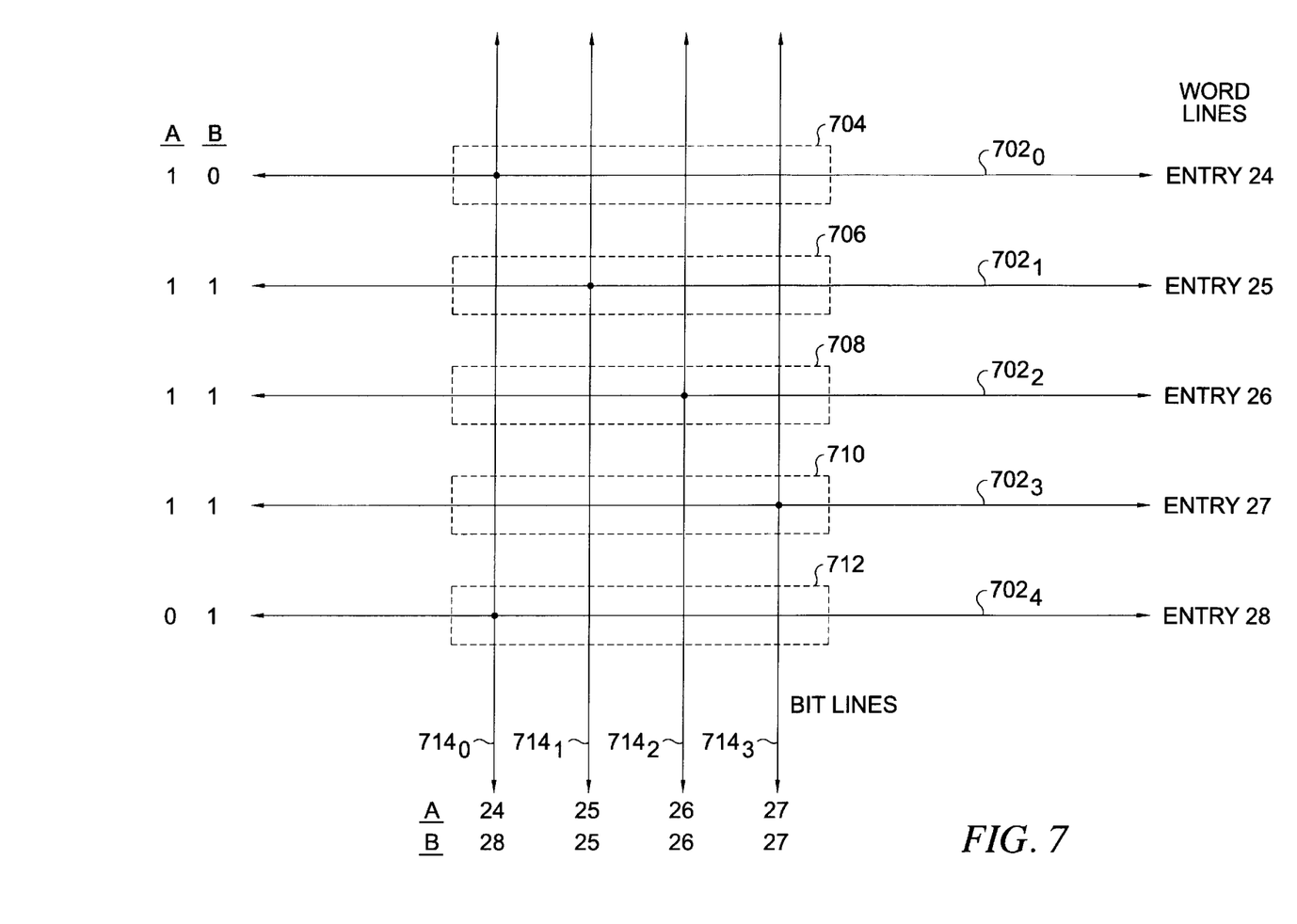
FIG. 7 is a more detailed illustration of a number of memory cells utilized in conjunction with the system and method of the present invention showing the one-to-one correspondence between word lines and the access of memory cell contents.

With reference additionally now to FIG. 7, a portion of a storage array 700 is shown which may correspond to a portion of the storage array 608 of FIG. 6. As can be seen, the storage array 700 requires only a single word line activation per entry as opposed to the four shown in the preceding FIG. 5. As an Example A, word line $702_0$ corresponds to the head pointer (H) and the entry (or word line) generation logic 606 (FIG. 6) develops and asserts word lines $702_1$, $702_2$ and $702_3$ as well. This would then cause the contents of entry location 704 (e.g. entry 24) to be read out on bit line $714_0$, the contents of entry location 706 (entry 25) to be read out on bit line $714_1$, the contents of entry location 708 (entry 26) to be read out on bit line $714_2$ and the contents of memory location 710 (entry 27) to be read out on bit line $714_3$.

As shown in Example B, if the head pointer (H) pointed to word line $702_1$, then the entry generation logic 606 would also generate the next three entries and assert lines $702_2$, $702_3$ and $702_4$. This would then serve to cause the contents of entry location 706 (entry 25) to be read out on bit line $714_1$, the contents of entry location 708 (entry 26) to be read out on bit line $714_2$, the contents of memory location 710 (entry 27) to be read out on bit line $714_3$ and the contents of memory location 712 (entry 28) to be read out on bit line $714_0$. By use of the multiplexers 610 and associated control logic 612 (FIG. 6) for selecting the desired input on one of the bit lines $714_0$ through $714_3$, the entries may be re-ordered sequentially as necessary.

Since the writing of up to four entries is allowed in the embodiment shown, up to four of the word lines (e.g. $702_0$ through $702_3$ in Example A or $702_1$ through $702_4$ in Example B) will be asserted starting at the location specified by the head pointer. The word line generation logic 606 (FIG. 6) is responsible for asserting the appropriate word lines based on the head pointer 604 and the control signals. The pointer update logic 602 is responsible for updating the head pointer 604. It can be seen that both the pointer update logic 602 and the word line generation logic 606 are considerably simpler than the logic required for the decoders and pointer updates in the conventional implementation shown FIG. 3.

Figure 8:
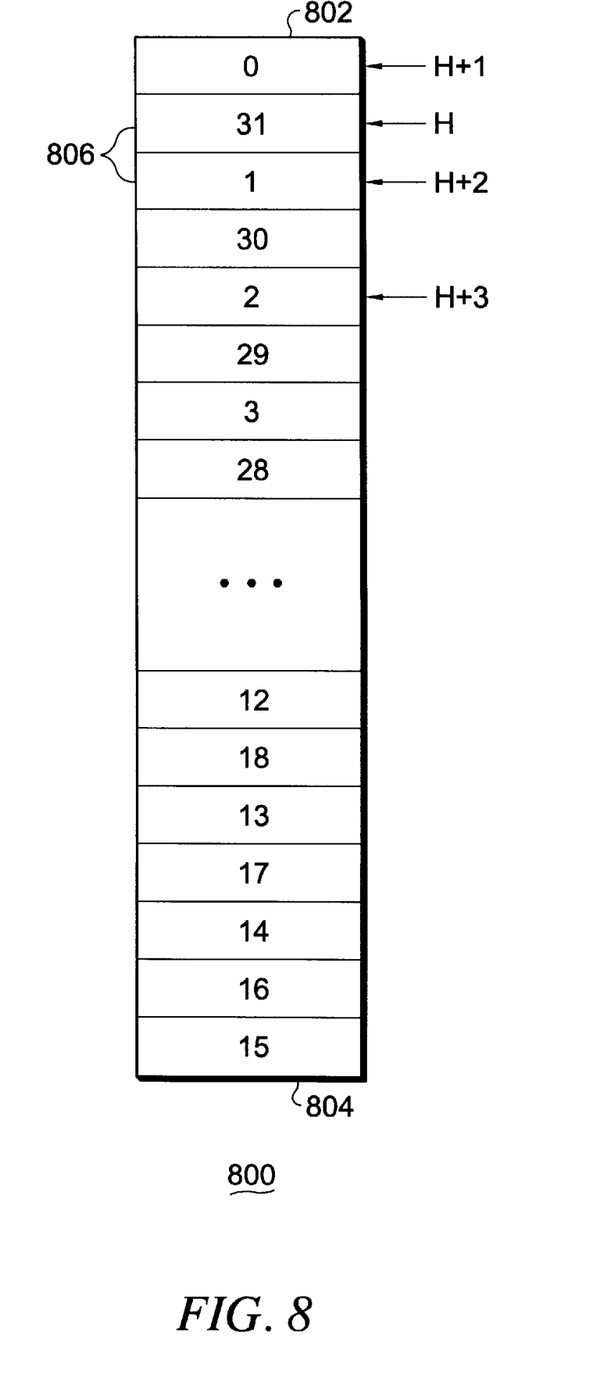
FIG. 8 is a representative illustration of the physical organization of a number of entries in a storage array of an exemplary 32 entry FIFO structure in order to speed access to the FIFO and reduce the length of the necessary electrical interconnects in an integrated circuit implementation of the present invention.

With reference additionally now to FIG. 8, the physical organization 800 of entry locations within the storage array 608 of FIG. 6 is shown. The physical organization 800 is shown as a substantially linear array of entries 806 extending from one end 802 to and opposite end 804. In this regard, entry "0" adjoins end 802, followed by entry "31", then, entry "1", followed by entry "30" and so forth in an interleaved fashion until the (n/2)–1 entry "15" is shown proximate to end 804. This interleaved, or folded arrangement of entries is especially efficacious in avoiding the routing of relatively long conductors in both the pointer update logic and word line generation logic, for example when the head pointer (H) points to entry "31", (H+1) points to entry "0", (H+2) points to entry "1" and (H+3) points to entry "2". As shown, since the physical implementation of the storage array is folded or interleaved, the order of entries is 0, 31, 1, 30, 2, 29, 3, 28 . . . and the necessity of routing long conductors (with their concomitant difficulty in layout and clock cycle latencies) is diminished as opposed to a more conventional sequential layout of physical entry locations.

It should be noted that while the principles of the present invention have been described above with respect to head pointers in particular, the same techniques may be applied for use with tail pointers utilized for writing data to a FIFO in accordance with the present invention.

While there have been described above the principles of the present invention in conjunction with specific exemplary embodiment and FIFO structure, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for accessing data entries in a memory array having n entry access lines and a plurality of data output lines, said method comprising the steps of:

pointing to a single entry position in said memory array with an n-bit word line, the entry position selected by setting a single one of the n-bit word lines to a first logic level and all remaining ones of the n-bit word lines to a second logic level;

generating a number of additional entry positions in said memory array based upon said entry position indicated by the selected single one of the n-bit word lines, each additional entry position generated by performing a shift operation, starting with the entry position pointed to during said step of pointing;

interleaving entries in said memory array such that a first entry position is located proximately to a last entry position;

asserting selected ones of said n entry access lines corresponding to said entry position indicated by the selected single one of the n-bit word lines and said additional entry positions generated during said step of generating; and placing said data entries corresponding to said entry position and said additional entry positions on said plurality of data output lines.

2. The method of claim 1 further comprising the step of:
updating said step of pointing to indicate a different entry position.

3. The method of claim 1 further comprising the step of:
sequentially ordering said data entries from said plurality of data output lines.

4. The method of claim 1 further comprising the step of:
further interleaving said entries in said memory array such that a second entry position is located intermediate said last entry position and a penultimate entry position.

5. The method of claim 1 wherein said step of generating comprises the step of:
sequentially producing said number of additional entry positions from said entry position.

6. The method of claim 1 wherein said step of sequentially producing provides three additional entry positions.

7. The method of claim 6 wherein said step of asserting selected ones of said n entry access lines is carried out by the step of:
simultaneously asserting selected ones of said n entry access lines corresponding to said entry position and said three additional entry positions.

* * * * *